(12) United States Patent
Blakey et al.

(10) Patent No.: US 7,261,820 B2
(45) Date of Patent: Aug. 28, 2007

(54) METHOD FOR DECREASING A CONCENTRATION OF METAL IN AQUEOUS SOLUTION

(75) Inventors: Brian Charles Blakey, Niskayuna, NY (US); James Rulon Young Rawson, Clifton Park, NY (US); Bang Mo Kim, Schenectady, NY (US); Angelo Anthony Bracco, Albany, NY (US)

(73) Assignee: General Electric Company, Niskayuna, NY (US)

( * ) Notice: Subject to any disclaimer, the term of this patent is extended or adjusted under 35 U.S.C. 154(b) by 433 days.

(21) Appl. No.: 10/873,598

(22) Filed: Jun. 23, 2004

(65) Prior Publication Data

US 2005/0287054 A1    Dec. 29, 2005

(51) Int. Cl.
    *C02F 1/62*   (2006.01)
    *C02F 101/20* (2006.01)
(52) U.S. Cl. .............. 210/695; 210/719; 210/724; 210/726; 210/912; 423/55; 423/61
(58) Field of Classification Search ............ 210/719
    See application file for complete search history.

(56) References Cited

U.S. PATENT DOCUMENTS

| 3,553,126 | A |   | 1/1971  | Oberhofer |             |
|-----------|---|---|---------|-----------|-------------|
| 4,211,753 | A |   | 7/1980  | Pemsler et al. |       |
| 4,222,872 | A | * | 9/1980  | Ramirez   | ...... 423/57 |
| 5,330,658 | A | * | 7/1994  | Grant et al. | ...... 210/717 |
| 5,976,383 | A | * | 11/1999 | Guess et al. | ...... 210/711 |
| 6,177,015 | B1| * | 1/2001  | Blakey et al. | ...... 210/713 |
| 6,322,701 | B1| * | 11/2001 | Delighiannis | ...... 210/620 |
| 6,428,705 | B1| * | 8/2002  | Allen et al. | ...... 210/638 |

OTHER PUBLICATIONS

Dannenberg, A.E., A.E. Petersen, P.B. Altringer, P.T. Brooks, "Molybdenum Removal from Concentrator Waste Water", U.S. Bureau of Mines, Report 8686, 1992.
LeGendre, G.R., D.D. Runnells "Removal of Dissolved Molybdenum from Wastwaters by Precipitates of Ferric Ion", Environmental Science and Technology, 9, 1975, pp. 744-749.
Beckstead, L.W. et al., "Precipitation of Molybdenum Sulfide from Aqueous Solution", Journal of Metals, Jul. 1985.

(Continued)

*Primary Examiner*—Peter A. Hruskoci
(74) *Attorney, Agent, or Firm*—Shawn A. McClintic; William E. Powell, III

(57) ABSTRACT

A method and system for decreasing the concentration of at least one metal in an aqueous solution. The metal may be molybdenum, tungsten, or both. An aqueous solution is introduced into at least one reaction zone, and at least one source of hydroxide ions is provided into the at least one reaction zone in an amount sufficient to precipitate at least some of the mass of the at least one metal. The aqueous solution includes a mass of the at least one metal and a mass of at least one reducing agent. The at least one reducing agent includes at least ferrous iron from at least one source of the at least one reducing agent. A composition of tungsten ferrite or molybdenum tungsten ferrite may be formed. The method may be used for purifying water, for the refining of metals, or to facilitate a chemical analytical determination.

20 Claims, 2 Drawing Sheets

OTHER PUBLICATIONS

Heininger, M.W., C.E. Meloan, "A Selective Reagent for the Removal and Recovery of Chromate, Molybdate, Tungstate, and Vanadate from Aqueous Solution", Separation Science and Technology, 27, 1992, pp. 663-669.

Wing R.E., W.E. Rayford, W.M. Doane, C.R. Russel, "Preparation of Insoluble Cationic Starches and their Use in Heavy Metal Anion Removal", Journal of Applied Polymer Science, 22, 1978, pp. 1405-1416.

Zhao, Y., A.I. Zouboulis, K.A. Matis, "Removal of Molybdate and Arsenate from Aqueous Solutions by Flotation", Separation Science and Technology, 31, 1996, pp. 769-785.

Morrison, S.J., R.R. Spangler, "Extraction of Uranium and Molybdenum from Aqueous Solutions: A Survey of Industrial Materials for Use in Chemical Barriers for Uranium Mill Tailings Remediation", Environmental Science and Technology, 26, 1992, pp. 1922-1931.

* cited by examiner

METHOD FOR DECREASING A CONCENTRATION OF METAL IN AQUEOUS SOLUTION

BACKGROUND

The invention generally relates to a method and a system for decreasing the concentration of molybdenum, tungsten, or both in aqueous solutions, and more particularly for precipitating molybdenum, tungsten, or both from aqueous solutions.

A need exists for decreasing the concentration of dissolved molybdenum and/or dissolved tungsten in aqueous solutions for several different purposes. Examples of some purposes include the purification of wastewater, groundwater, drinking water and process plant water, the refining of metals and the facilitation of chemical analytical determinations.

Although a variety of existing processes are known for decreasing the concentration of molybdenum in aqueous solutions, the existing processes suffer from one or more disadvantages. Existing processes for decreasing the concentration of molybdenum in aqueous solutions often require expensive chemical reagents, excessive quantities of chemical reagents and/or toxic chemical reagents. Examples of known processes include co-precipitation with ferric hydroxide, ferrous hydroxide ammonium molybdate precipitation, molybdenum sulfide precipitation and precipitation using organic compounds (see Dannenberg et al., "*Molybdenum Removal from Concentrator Waste Water*", U.S. Bureau of Mines Report, July 1982, U.S. Pat. No. 4,211,753 to Pemsler and Litchfield; Beckstead et al., "*Precipitation of Molybdenum Sulfide from Aqueous Solution*", JOURNAL OF METALS, July 1985 and Heininger and Meloan, "*A Selective Reagent for the Removal and Recovery of Chromate, Molybdate, Tungstate, and Vanadate from Aqueous Solution*", SEPARATION SCIENCE AND TECHNOLOGY, 27, 1992, pp. 663-669).

Other examples of known processes to decrease the concentration of molybdenum in aqueous solutions do not involve precipitation, such as ion exchange and adsorption (see, e.g., U.S. Pat. No. 3,553,126 to Oberhofer; Wing et al. "*Preparation of Insoluble Cationic Starches and their Use in Heavy Metal Anion Removal*", JOURNAL OF APPLIED POLYMER SCIENCE, 22, 1978, pp. 1405-1416; Zhao et al., "*Removal of Molybdate and Arsenate from Aqueous Solutions by Flotation*", SEPARATION SCIENCE AND TECHNOLOGY, 31, 1996, pp. 769-785).

Few processes are known for decreasing the concentration of tungsten in aqueous solutions.

There exists a need for a method and a system for decreasing the concentration of molybdenum and/or tungsten in aqueous solutions that have at least one of the following advantages: no requirement for expensive chemical reagents, no requirement for excessive quantities of chemical reagents and no requirement for toxic chemical reagents.

SUMMARY

An embodiment of the invention provides a method for decreasing the concentration of at least one metal in an aqueous solution. The metal may be molybdenum, tungsten, or both. The method includes providing an aqueous solution into at least one reaction zone, and providing at least one source of hydroxide ions into the at least one reaction zone in an amount sufficient to precipitate at least some of the mass of the at least one metal. The aqueous solution includes a mass of the at least one metal and a mass of at least one reducing agent. The at least one reducing agent includes at least ferrous iron from at least one source of the at least one reducing agent.

Another embodiment provides a composition comprising tungsten ferrite. Another embodiment provides a composition comprising molybdenum tungsten ferrite.

Another embodiment provides a water purification system, wherein purification includes decreasing the concentration of at least one metal. The water comprises wastewater, groundwater, drinking water, and/or process water. The water purification system comprises at least one reactor having at least one reaction zone and configured to receive an aqueous solution into a reaction zone and at least one source of hydroxide ions into the reaction zone in an amount sufficient to precipitate at least some of the mass of the at least one metal. The aqueous solution comprises: (i) a mass of at least one metal comprising molybdenum or tungsten; and (ii) a mass of at least one reducing agent comprising at least ferrous iron.

DETAILED DESCRIPTION OF EXEMPLARY EMBODIMENTS

Reference will now be made in detail to the embodiments of the invention which are illustrated in the accompanying figures and examples.

Figure 1:
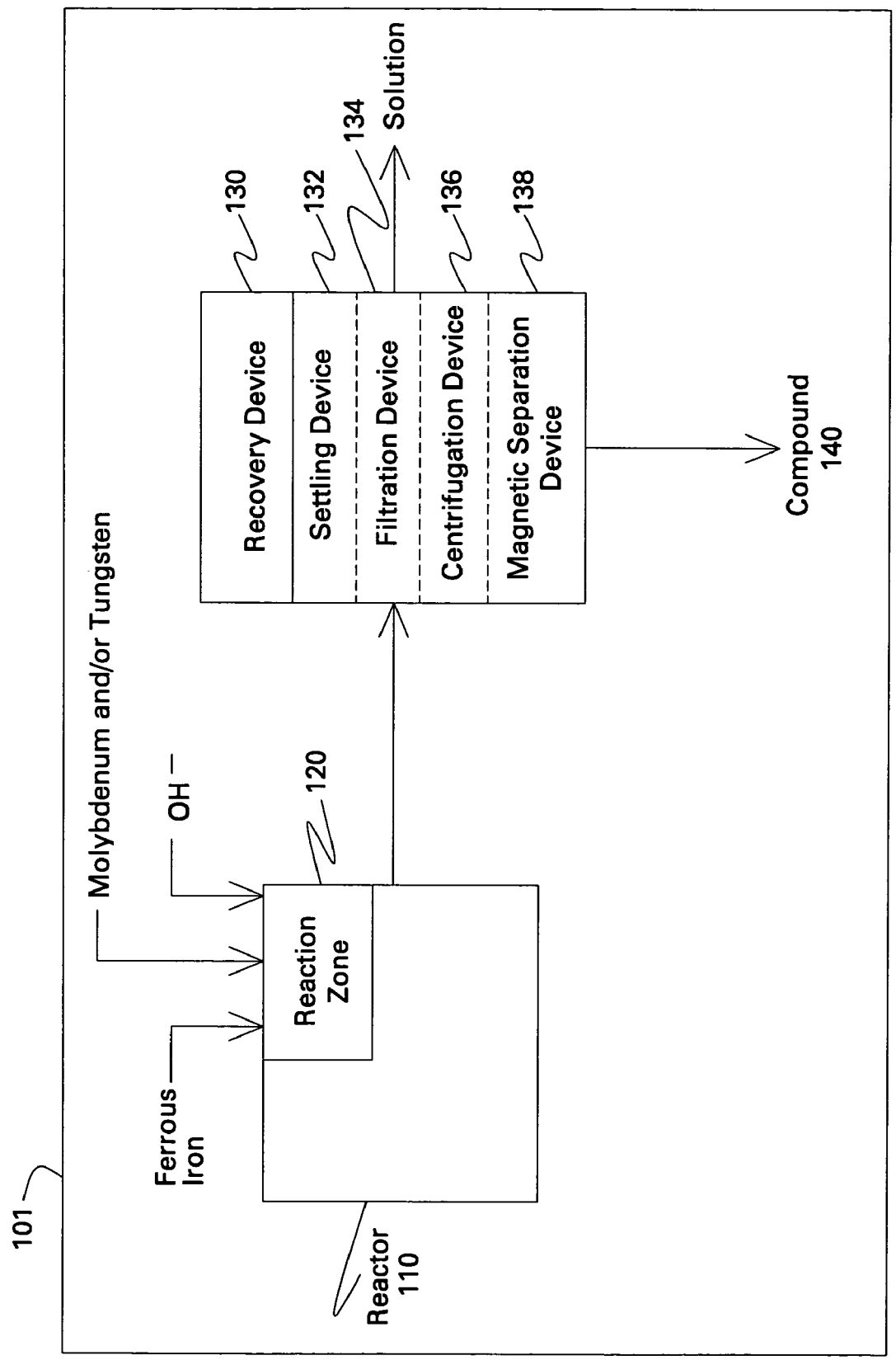
FIG. 1 illustrates a water purification system in accordance with an exemplary embodiment of the invention.

An embodiment of the invention provides a water purification system, wherein purification includes decreasing the concentration of at least one metal. The water may include wastewater, groundwater, drinking water, and/or process water. The metal may be molybdenum, tungsten, or both. FIG. 1 is an illustration of a water purification system 101 in accordance with an exemplary embodiment of the invention. Water purification system 101 includes at least one reactor 110, which includes at least one reaction zone 120. Reaction zone 120 is configured to receive an aqueous solution and to receive at least one source of hydroxide ($OH^-$) ions in an amount sufficient to precipitate at least some of the mass of the metal. The aqueous solution includes (i) a mass of the metal and (ii) a mass of at least one reducing agent. The reducing agent includes at least ferrous iron from at least one source of the reducing agent.

The source of the reducing agent includes, but is not limited to, ferrous sulfate, ferrous chloride, metallic iron, or combinations thereof. An example of the reducing agent is ferrous iron. The mass of the ferrous iron, serving as the reducing agent, may be at least about three times the mass of the molybdenum that is desired to be precipitated from the aqueous solution. As another example, the mass of the ferrous iron may be at least about six times the mass of the molybdenum that is desired to be precipitated from the aqueous solution.

Further, the mass of the ferrous iron, serving as the reducing agent, may be at least about 1.5 times the mass of tungsten that is desired to be precipitated from the aqueous solution. As another example, the mass of the ferrous iron may be at least about three times the mass of the tungsten that is desired to be precipitated from the aqueous solution.

The reaction zone 120 may be maintained at a pH in a range from about 6 to about 14.

The reaction zone 120 may be maintained at a temperature in a range from about 0° C. to about 100° C.

For illustration and not limitation, the reaction zone 120 may be in one or more reactors 110. Each reactor 110 may be a continuous tank reactor, a continuous tubular reactor, a batch reactor, or combinations thereof.

The source of $OH^-$ ions includes, but is not limited to, sodium hydroxide, potassium hydroxide, magnesium hydroxide, calcium hydroxide, magnesium oxide, calcium oxide, calcium carbonate, potassium carbonate, or combinations thereof. Furthermore, the source of $OH^-$ ions may include other sources.

The water purification system 101 may optionally form a compound 140 having at least some mass of the metal. The compound 140 is formed as the mass of the metal is precipitated. Furthermore, the water purification system 101 may optionally include at least one recovery device 130 for recovering the compound 140. The recovery device 130 may include a device for settling 132, filtration 134, centrifugation 136, magnetic separation 138, or combinations thereof.

Figure 2:
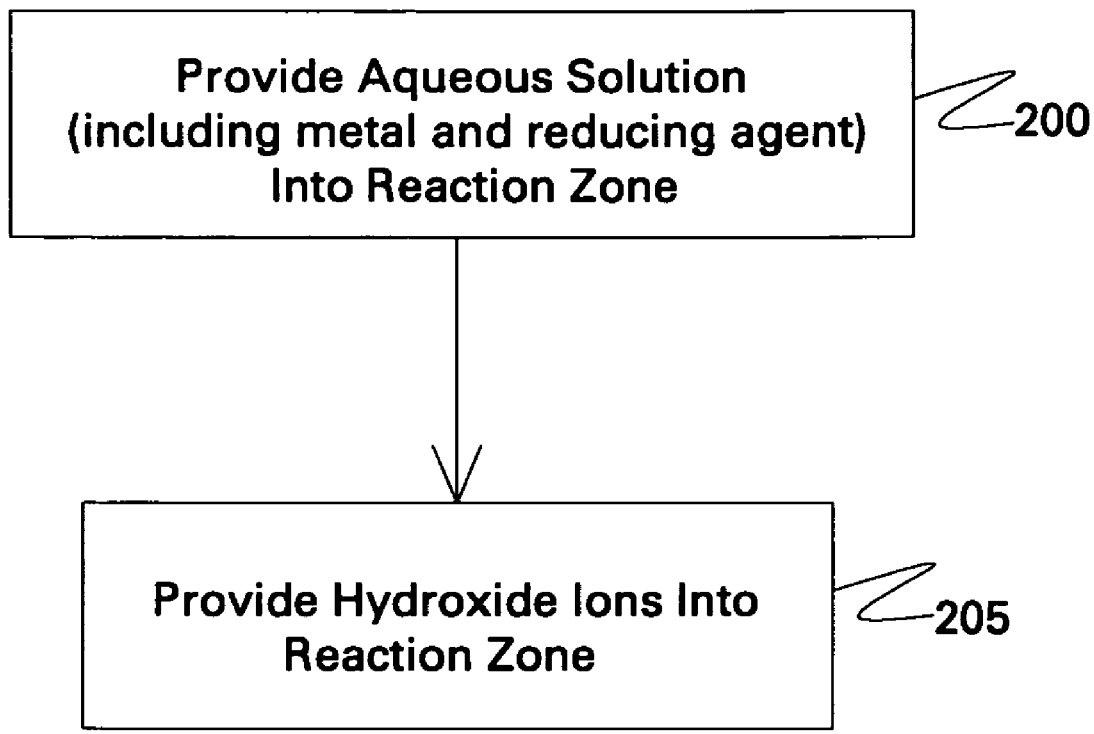
FIG. 2 illustrates a method for decreasing the concentration of a metal in an aqueous solution.

With reference to FIG. 2, next will be described a method for decreasing the concentration of at least one metal in an aqueous solution. The metal may be molybdenum, tungsten, or both. The method includes at Step 200 providing an aqueous solution into at least one reaction zone, and at Step 205, providing at least one source of hydroxide ions into the at least one reaction zone in an amount sufficient to precipitate at least some of the mass of the at least one metal. The aqueous solution includes a mass of the metal and a mass of the reducing agent. The reducing agent includes at least ferrous iron from at least one source of reducing agent.

The method of precipitating molybdenum and/or tungsten may be utilized for the purpose of purifying water, for refining metals, or for facilitating a chemical analytical determination.

The method may be used to form a compound having some mass of the metal. The compounds that may be formed by the method include tungsten ferrite ($Fe_2WO_4$) and molybdenum tungsten ferrite ($Fe_2(Mo,W)O_4$).

Certain aspects of the invention are illustrated in the following Examples 1 through 10. The following examples are included for the purpose of exemplification and are not to be construed as limiting the scope of the present invention.

EXAMPLE 1

In this example, an aqueous solution of sodium molybdate was delivered into the reaction zone of a one liter stirred tank reactor, as was a small volume of an aqueous solution of ferrous sulfate containing 50 grams of ferrous iron per liter. The volume of the solution in the reaction zone was approximately 950 milliliters. The concentration of molybdenum in the solution in the reaction zone was initially about 227 milligrams per liter and the ratio of the mass of ferrous iron to the mass of molybdenum in the reaction zone was initially about 3.2. The reactor was heated to maintain the temperature of the reaction zone at approximately 30° C. The pH of the reaction zone was then raised to and maintained at approximately 9.7 by delivering into the reaction zone small volumes of an aqueous solution containing one mole of sodium hydroxide per liter. A sample was taken from the reaction zone approximately 20 minutes after adding the sodium hydroxide solution, and the sample was filtered using a 0.45-micron membrane filter. The concentration of molybdenum in the filtrate was measured using inductively coupled plasma emission spectroscopy, and the percentage of molybdenum precipitated from solution was determined to be 83. The results are summarized in Table 1.

EXAMPLE 2

This example was conducted in a manner similar to that of Example 1 except that the temperature of the reaction zone was maintained at approximately 60° C. The percentage of molybdenum precipitated from solution was determined to be 89. The results are summarized in Table 1.

COMPARATIVE EXAMPLE A

This comparative example was conducted in a manner similar to that of Example 2 except that ferrous iron was not added. The percentage of molybdenum precipitated from solution was determined to be zero. The results are summarized in Table 1.

EXAMPLE 3

This example was conducted in a manner similar to that of Example 1 except that the ratio of the mass of ferrous iron to the mass of molybdenum was initially about 9.4, and the pH was maintained at approximately 7.5. The percentage of molybdenum precipitated from solution was determined to be 78. The results are summarized in Table 1.

EXAMPLE 4

This example was conducted in a manner similar to that of Example 1 except that the temperature was maintained at approximately 90° C. and the pH was maintained at approximately 7.5. The percentage of molybdenum precipitated from solution was determined to be 99. The results are summarized in Table 1.

EXAMPLE 5

This example was conducted in a manner similar to that of Example 2 except that the concentration of molybdenum in the solution in the reaction zone was initially about 4.9 milligrams per liter, the ratio of the mass of ferrous iron to the mass of molybdenum in the reaction zone was initially about 6.0, and the pH was maintained at approximately 8.5. The percentage of molybdenum precipitated from solution was determined to be 76. The results are summarized in Table 1.

EXAMPLE 6

This example was conducted in a manner similar to that of Example 4 except that the concentration of molybdenum in the solution in the reaction zone was initially about 0.46 milligrams per liter, and the ratio of the mass of ferrous iron to the mass of molybdenum in the reaction zone was initially about 35. The percentage of molybdenum precipitated from solution was determined to be 57. The results are summarized in Table 1

TABLE 1

| Example | Initial concentration of molybdenum (milligrams per liter) | Initial ferrous iron-to-molybdenum mass ratio | Temperature (° C.) | pH | Percentage of molybdenum precipitated from solution 20 minutes after addition of sodium hydroxide solution |
| --- | --- | --- | --- | --- | --- |
| 1 | 227 | 3.2 | 30 | 9.7 | 83 |
| 2 | 219 | 3.1 | 60 | 9.5 | 89 |
| Comparative Example A | 246 | 0.0 | 60 | 9.5 | 0 |
| 3 | 230 | 9.4 | 30 | 7.5 | 78 |
| 4 | 233 | 3.6 | 90 | 7.5 | 99 |
| 5 | 4.9 | 6.0 | 60 | 8.5 | 76 |
| 6 | 0.46 | 35 | 90 | 7.5 | 57 |

EXAMPLE 7

In this example, an aqueous solution of sodium molybdate, containing approximately 243 milligrams of molybdenum per liter, was delivered into a reaction zone in a one-liter continuous stirred tank reactor at a rate of approximately 38 milliliters per minute. An aqueous solution of ferrous sulfate, containing 50 grams of ferrous iron per liter, was also delivered into the reaction zone so that the ratio of the mass of ferrous iron delivered into the reaction zone to the mass of molybdenum delivered into the reaction zone was about 8.7. An aqueous solution containing 2 moles sodium hydroxide per liter was also delivered to the reaction zone to control the pH of the reaction zone at approximately 8.5. The volume of fluid in the reaction zone was approximately 1200 milliliters, and the residence time of fluid in the reaction zone was about 30 minutes. The reaction zone was maintained at a temperature of approximately 20° C. A sample of the fluid exiting the reactor was taken after at least three reaction zone volumes had been displaced by solution entering the reactor, and the sample was filtered using a 0.45-micron membrane filter. The concentration of molybdenum in the filtrate was measured using inductively coupled plasma emission spectroscopy and the percentage of molybdenum precipitated from solution was determined to be 98. The results are summarized in Table 2.

EXAMPLE 8

This example was conducted in a manner similar to that of Example 7 except that the temperature was maintained at approximately 60° C. The percentage of molybdenum precipitated from solution was determined to be 98. The results are summarized in Table 2.

EXAMPLE 9

In this example, an aqueous solution of sodium tungstate, containing approximately 22 milligrams of tungsten per liter, was delivered into a reaction zone in a one liter continuous stirred tank reactor at a rate of approximately 39 milliliters per minute. An aqueous solution of ferrous sulfate, containing 50 grams of ferrous iron per liter, was also delivered into the reaction zone so that the ratio of the mass of ferrous iron delivered into the reaction zone to the mass of tungsten delivered into the reaction zone was about 32.0. An aqueous solution containing two moles sodium hydroxide per liter was also delivered to the reaction zone to control the pH at approximately 9.0. The volume of the fluid in the reaction zone was approximately 1200 milliliters, and the residence time of fluid in the reaction zone was approximately 30 minutes. The reaction zone was maintained at a temperature of approximately 20° C. A sample of the fluid exiting the reactor was taken after at least three reaction zone volumes had been displaced by solution entering the reactor, and the sample was filtered using a 0.45-micron membrane filter. The concentration of tungsten in the filtrate was measured using inductively coupled plasma emission spectroscopy and the percentage of tungsten precipitated from solution was determined to be 64. The results are summarized in Table 3.

EXAMPLE 10

This example was conducted in a manner similar to that of Example 9 except that ratio of the mass of ferrous iron to the mass of tungsten was about 13.0, the temperature was maintained at approximately 60° C., and the pH was controlled at approximately 8.5. The percentage of tungsten precipitated from solution was determined to be 98. The results are summarized in Table 3.

TABLE 2

| Example | Initial concentration of molybdenum (milligrams per liter) | Ferrous iron-to-molybdenum mass ratio fed into reaction zone | Residence time (minutes) | Temperature (° C.) | pH | Percentage of molybdenum precipitated from solution |
| --- | --- | --- | --- | --- | --- | --- |
| 7 | 243 | 8.7 | 30 | 20 | 8.5 | 98 |
| 8 | 247 | 8.3 | 30 | 60 | 8.5 | 98 |

TABLE 3

| Example | Initial concentration of tungsten (milligrams per liter) | Ferrous iron-to-tungsten mass ratio fed into reaction zone | Residence time (minutes) | Temperature (° C.) | pH | Percentage of tungsten precipitated from solution |
| --- | --- | --- | --- | --- | --- | --- |
| 9 | 22 | 32 | 30 | 20 | 9.0 | 64 |
| 10 | 22 | 13 | 30 | 60 | 8.5 | 98 |

Certain aspects of this invention have been illustrated in the above Examples 1 through 10 for the purpose of exemplification and are not to be construed as limiting the scope of the invention. For illustration and not limitation, aspects of the invention encompass when the metal includes molybdenum and the reducing agent includes ferrous iron. For example, the mass of ferrous iron was at least about three times the mass of the molybdenum that is desired to be precipitated from the aqueous solution. As another example, the mass of the ferrous iron may be at least about six times the mass of the molybdenum that is desired to be precipitated from the aqueous solution.

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
   a) providing an aqueous solution into at least one reaction zone, said aqueous solution comprising:
      i) tungsten; and
      ii) at least one reducing agent comprising ferrous iron, and the ferrous iron comprises ferrous chloride or metallic iron; and
   b) providing hydroxide ions into the reaction zone in an amount sufficient to precipitate at least some of the tungsten in the form of tungsten ferrite, and thereby decreasing the concentration of the tungsten in the aqueous solution, wherein the mass of said ferrous iron provided to said at least one reaction zone is at least about 1.5 times the mass of said tungsten, and wherein said at least one reaction zone is maintained at a pH in the range from about 6 to about 14.

2. The method of claim 1, wherein the mass of said ferrous iron provided to said at least one reaction zone is at least about three times the mass of said tungsten.

3. The method of claim 1, wherein said at least one reaction zone is maintained at a temperature in a range from about 0° C. to about 100° C.

4. The method of claim 1, wherein said at least one reaction zone is in at least one reactor selected from a group consisting of a continuous tank reactor, a continuous tubular reactor, and a batch reactor.

5. The method of claim 1, wherein said hydroxide ions are derived from a material that is selected from a group consisting of sodium hydroxide, potassium hydroxide, magnesium hydroxide, calcium hydroxide, magnesium oxide, calcium oxide, calcium carbonate, and potassium carbonate.

6. The method of claim 5, wherein the hydroxide ions are derived from sodium hydroxide.

7. The method of claim 5, wherein the hydroxide ions are derived from potassium hydroxide.

8. The method of claim 5, wherein the hydroxide ions are derived from magnesium hydroxide.

9. The method of claim 5, wherein the hydroxide ions are derived from calcium hydroxide.

10. The method of claim 5, wherein the hydroxide ions are derived from magnesium oxide.

11. The method of claim 5, wherein the hydroxide ions are derived from calcium oxide.

12. The method of claim 5, wherein the hydroxide ions are derived from calcium carbonate.

13. The method of claim 5, wherein the hydroxide ions are derived from potassium carbonate.

14. The method of claim 1, further comprising recovering at least some of said tungsten ferrite.

15. The method of claim 14, wherein recovering comprises settling, filtering, centrifuging, or magnetically separating.

16. The method of claim 1, wherein the decreasing of the concentration is to an amount such that up to 98 percent of the tungsten is removed from the aqueous solution.

17. The method of claim 1, wherein the decreasing of the concentration of the tungsten in the aqueous solution refines the tungsten.

18. The method of claim 1, wherein the ferrous iron comprises ferrous chloride.

19. The method of claim 1, wherein the ferrous iron comprises metallic iron.

20. The method of claim 1, wherein the reaction zone is maintained at a pH of about 8.5.

* * * * *